United States Patent [19]

Cornwall

[11] Patent Number: 4,724,858

[45] Date of Patent: Feb. 16, 1988

[54] FIRESTOP STACK FITTING

[76] Inventor: Kenneth R. Cornwall, 4963 Springfield Dr., Dunwoody, Ga. 30338

[21] Appl. No.: 81,742

[22] Filed: Aug. 5, 1987

[51] Int. Cl.⁴ .............................................. E03D 1/00
[52] U.S. Cl. .................................... 137/75; 137/362; 285/64; 220/89 B
[58] Field of Search .................. 137/75, 360, 367, 72, 137/74; 52/221, 232; 285/64; 138/89; 220/89 B, 88 R

[56] References Cited

U.S. PATENT DOCUMENTS

| | | | |
|---|---|---|---|
| 3,678,634 | 7/1972 | Wise | 52/232 X |
| 3,726,050 | 4/1973 | Wise | 137/75 X |
| 4,583,565 | 4/1986 | Cornwall | 137/75 X |
| 4,623,170 | 11/1986 | Cornwall | 285/64 X |

*Primary Examiner*—Harold W. Weakley
*Attorney, Agent, or Firm*—Ian C. McLeod

[57] ABSTRACT

An improved firestop fitting with a flammable main conduit (11) and extension conduit (12) supporting a non-flammable sleeve (14) and plug (16). The plug lodges into the sleeve when a harness (17) is melted by heat from a fire below the floor (100 or 101) in which the fitting is mounted which passes into the conduits. The fitting is relatively light and inexpensive.

23 Claims, 5 Drawing Figures

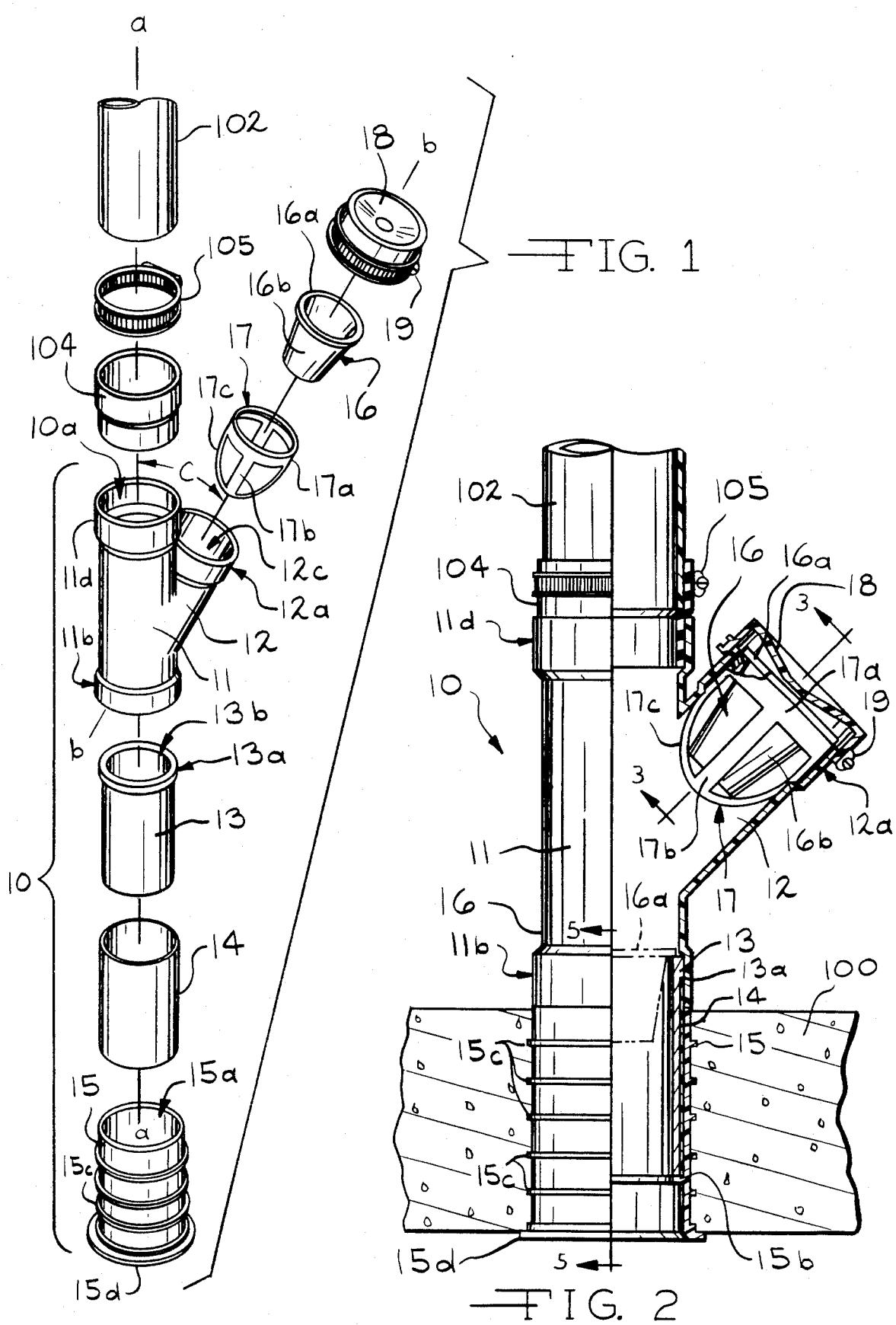

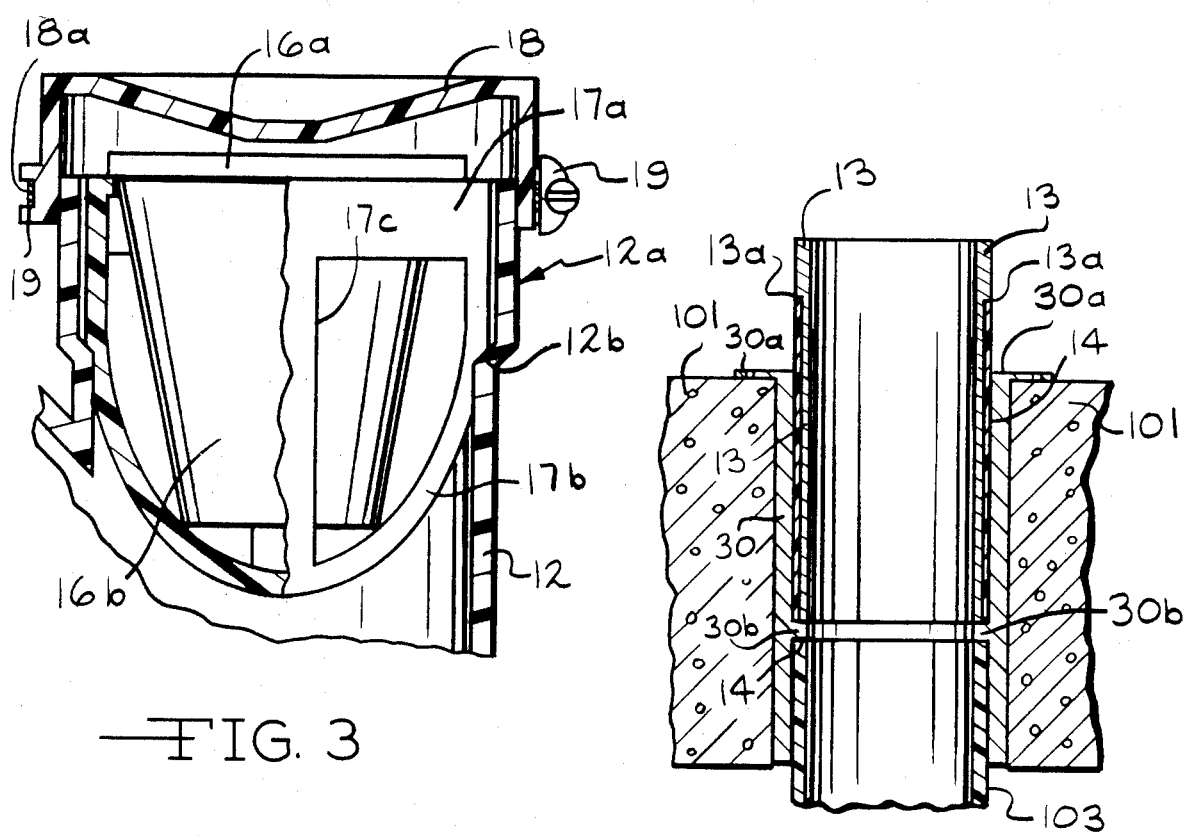
FIG. 3
FIG. 4
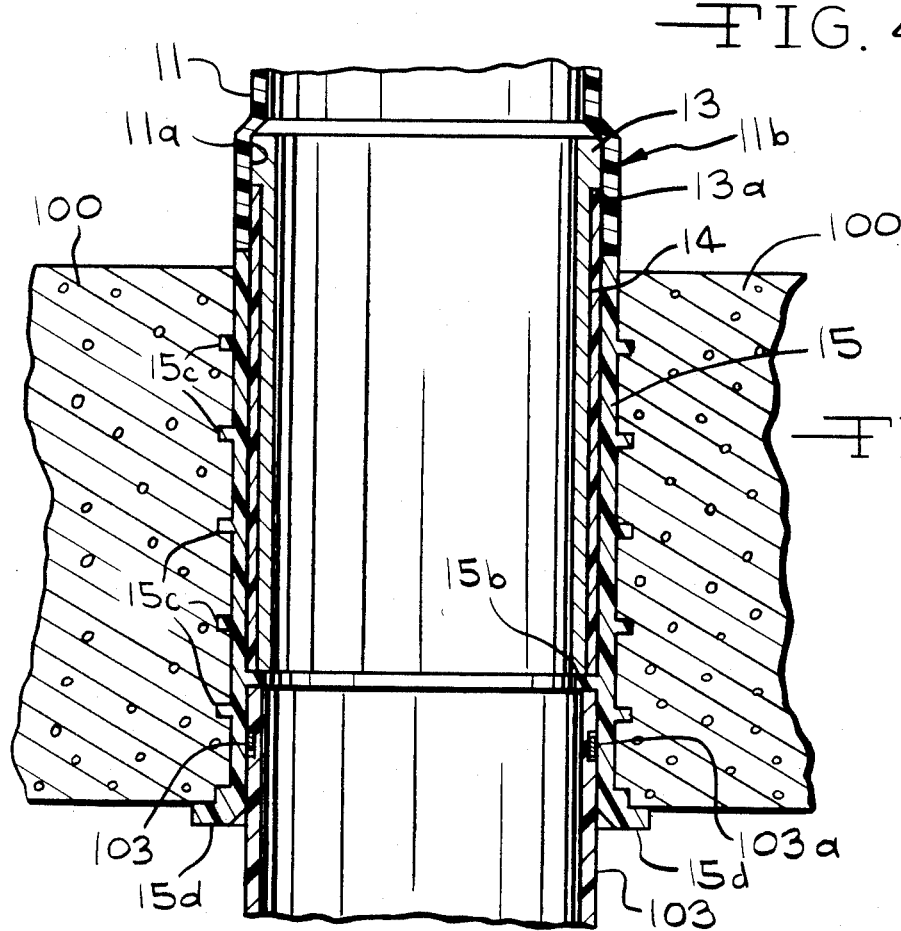
FIG. 5

FIRESTOP STACK FITTING

BACKGROUND OF THE INVENTION (1) Summary of the Invention

The present invention relates to an improved firestop stack fitting which has a flammable conduit and extension and yet prevents the spread of fire between floors in a building. In particular, the present invention relates to a fitting which uses only a non-flammable plug and a non-flammable sleeve inside the fitting as the essential non-flammable elements which combine together to prevent the spread of fire between floors when the plug is released by the fire.

(2) Prior Art

My U.S. Pat. No. 4,583,546 shows the closest prior art. In this firestop stack fitting the main conduit and extension conduit were made of cast iron or some other non-flammable material. This combination works very well; however, it is expensive to manufacture. It was thought by the inventor that the conduit and extension had to be non-flammable in order to make the fitting operative.

OBJECTS

It is therefore an object of the present invention to provide an improved firestop stack fitting wherein the main conduit and extension conduit are composed of a flammable material such that the non-flammable parts are reduced to a minimum without compromising safety. Further it is an object of the present invention to provide an improved firestop stack fitting which is lighter and relatively less inexpensive to manufacture than the prior art fitting. These and other objects will become increasingly apparent by reference to the following description and the drawings.

In the Drawings

FIG. 1 is a perspective separated view of the improved fire stack fitting 10 of the present invention showing the non-flammable plug 16 and non-flammable sleeve 13 prior to release by a fire from the floor below the fitting 10.

FIG. 2 is a front partial cross-sectional view of the assembled fire stack fitting shown in FIG. 1, particularly illustrating the position of the released plug 16 in dotted lines in sleeve 13.

FIG. 3 is an enlarged front partial sectional view of the unreleased plug 16 mounted on harness 17 in extension 12.

FIG. 4 is a front sectional view of an alternative type of coupling 30 which is pressed into a pre-formed or cored hole in a floor 101 rather than being cast in place in the manner of coupling 15 in floor 100.

FIG. 5 is an enlarged front partial cross-sectional view of the mounting of the sleeve 13 in a coupling 15 in the floor 100.

GENERAL DESCRIPTION

The present invention relates to a stack fitting which prevents spread of fire through a floor of a building which comprises: a flammable, fluid carrying main conduit having a first longitudinal axis (a-a) between two opposed openings and adapted to be connected through a floor in a building to vertically oriented fluid conduit pipe between the floors; a flammable extension conduit from the main conduit positioned with a second axis at an acute angle from the longitudinal axis of the main conduit with an opening; a non-flammable plug mounted in the extension conduit on a flammable support provided in the extension conduit which is releasable by melting at a lower temperature than the conduits upon exposure of the support to heat through the main conduit from a fire in the building in which it is adapted to be oriented below the floor to thereby move the plug into the main conduit; closure means for the extension conduit opening; and a non-flammable sleeve with openings at opposed ends mounted inside the main conduit below the plug and the extension conduit, wherein when the flammable support is released the plug falls into the non-flammable sleeve to close the non-flammable sleeve and prevent the spread of fire between the floors.

Further the present invention relates to a building construction which prevents spread of fires between a floor of the building through a pipe which comprises: a stack fitting which prevents spread of fire which comprises: a flammable, fluid carrying main conduit having a first longitudinal axis (a-a) between two opposed openings and adapted to be connected through the floor in the building to vertically oriented fluid conduit plastic pipe between floors; a flammable extension conduit from the main conduit positioned with a second axis at an acute angle from the longitudinal axis of the main conduit with an opening; a non-flammable plug mounted in the extension conduit on a plastic support provided in the extension conduit which is releasable by melting at a lower temperature than the conduits upon exposure of the support to heat through the main conduit from a fire in the building below the floor to thereby move the plug into the main conduit; closure means for the extension conduit opening; and a non-flammable sleeve with openings at opposed ends mounted inside the main conduit below the plug and extension conduit, wherein the plug when then flammable support is released the plug falls into the non-flammable sleeve to close the non-flammable sleeve and prevent the spread of fire between the floors; a floor mounting the main conduit of the fitting so as to convey fluid through the floor; and fluid carrying pipe connected to both openings of the main conduit. The acute angle is preferably between about 10° and 45°.

The prior art fitting of my U.S. Pat. No. 4,583,546 has a non-flammable main conduit and extension conduit. It was thought that in order for the fitting to be effective, the support structure for the plug had to be non-flammable. The concern is with fire passing from a lower floor to an upper floor through a pipe opening and the harness supporting the plug melts at a relatively low temperature, considerably less than that of the plastic (PVC) which is the plastic pipe between the floors. Usually the harness melts at between about 180° F. and 240° F. Thus it was unexpectedly found that an inexpensive sleeve could replace the non-flammable main and extension conduits.

SPECIFIC DESCRIPTION

FIGS. 1 to 5 show the improved fire stack fitting 10 or portions thereof. The fitting 10 includes a main conduit 11 and an integral extension conduit 12 at an acute angle c between a first longitudinal axis a-a of the conduit 12 and an axis b-b of the extension conduit. The conduits 11 and 12 are made of a flammable material particularly a plastic material, and generally in the form of an integral "Y" with collars or enlarged portions 11b, 11c and 12a for attaching pipe or other fittings. An iron sleeve 13 is fitted into the conduit below the extension conduit 12 and is held in place by a plastic spacer tube 14 which mounts around the outside cylindrical of the sleeve 13 and is secured by solvent welding to the inner wall 11a of conduit 121 and then to the inner wall 15a of a plastic coupling 15. The sleeve 13 has an outer ring 13a which is engaged for support by one end of the spacer tube 14. The coupling 15 is mounted through a concrete floor 100 (FIGS. 2 and 5). The spacer tube 14 and sleeve 13 at an opposite end from the ring 13a engage an internal ring 15b which is integrally formed inside the coupling 15. In this manner the non-flammable sleeve 13 is secured in place inside the coupling 15. The coupling 15 has external rings 15c and is cast in place in the floor 100 and held in place in the floor 100 by external rings 15c. The coupling 15 has a lower mounting flange 15d which is used to support the coupling 15 on a form (not shown) during pouring of the concrete floor 100. FIG. 4 shows a coupling 30 which is pressed and secured in place with an adhesive in a cored opening in concrete floor 101. An upper flange 30a provides support for the coupling 30 in the floor 101. The sleeve 13 and spacer tube 14 are mounted in the coupling 30 and engage an internal ring 30b of the coupling 30 in the same manner as in coupling 15.

FIGS. 1 to 3 show a non-flammable cone shaped plug 16 mounted on a harness 17 in the extension conduit 12. The harness 17 acts to release the plug 16 by melting. The harness 17 includes collar 17a with integral temperature crossed straps 17b and 17c. A single strap 17b or 17c is as effective and less expensive. The inside portion of the collar 17a engages a lip 16a of the plug 16 and the truncated conical apex 16b of the plug 16 is supported by straps 17b and 17c. The harness 17 is mounted in the opening 12c of the extension conduit 12 and rests on a shoulder 12b (FIG. 3) of the extension conduit 12. The plug 16 rests on the harness 17 and is small enough to pass through the extension conduit 11 when the harness 17 is melted by a fire. A cap 18 closes the opening 17a of the extension conduit 12 and is sealed on the extension conduit 12 by a clamp 19 in a recess 18a of the cap 18. Essentially the mounting of the plug 16 is similar to that shown in my U.S. Pat. No. 4,583,565.

The fitting 10 is coupled to pipes 102 and 103 on either side of the floor 100 or 101 which are usually made of plastic. The plastic pipe 103 is solvent welded into the coupling 10 against the ring 15b or 30b. O rings 103a can be used for additional seating. The pipe 102 is generally provided with a flexible PVC coupling rubber sleeve 104 secured by solvent welding inside a shoulder 10a of the conduit 10 and secured to pipe 102 by a clamp 105. This construction allows easy mounting of the pipes 102 and 103.

In operation a fire inside pipe 103 allows heat to reach the harness 17 which melts the straps 17b and/or 17c. The plug 16 is released and lodges in the sleeve 13 to provide a fire seal between the upper and lower portions of floor 100 or 101. This prevents the spread of fire between the floors 100 or 101. Preferably the inner portion 13b of lips 13a on the sleeve 13 is chamfered to make certain that the plug 16 moves correctly and reliably into the sleeve 13.

It will be appreciated that the plug 16 can have any shape although the truncated cone shape is preferred. The plug 16 could be round for instance. The essential feature is that the sleeve and plug mate together sufficiently to provide the fire seal.

Numerous variations will occur to those skilled in the art. It is intended that the foregoing description be only illustrative of the present invention and that the present invention be limited by the hereinafter appended claims.

I claim:

1. A stack fitting which prevents spread of fire through a floor of a building which comprises:
   (a) a flammable, fluid carrying main conduit having a first longitudinal axis between two opposed openings and adapted to be connected through a floor in a building to vertically oriented fluid conduit pipe between the floors;
   (b) a flammable extension conduit from the main conduit positioned with a second axis at an acute angle from the longitudinal axis of the main conduit with an opening;
   (c) a non-flammable plug mounted in the extension conduit on a flammable support provided in the extension conduit which is releasable by melting at a lower temperature than the conduits upon exposure of the support to heat through the main conduit from a fire in the building in which it is adapted to be oriented below the floor to thereby move the plug into the main conduit;
   (d) closure means for the extension conduit opening; and
   (e) a non-flammable sleeve with openings at opposed ends mounted inside the main conduit below the plug and the extension conduit, wherein when the flammable support is released the plug falls into the non-flammable sleeve to close the non-flammable sleeve and prevent the spread of fire between the floors.

2. The fitting of claim 1 wherein the main conduit and extension conduit are integral, each having a circular internal cross-section, wherein the non-flammable sleeve has a circular cross-section, wherein the plug is shaped as a cone with a base and with a truncated apex positioned towards the main conduit and wherein upon release the plug enters into an uppermost of the openings in the sleeve to close the opening.

3. The fitting of claim 2 wherein the plug has an integral lip adjacent the base having a diameter slightly smaller than an internal diameter of the extension conduit and larger than an internal diameter of the sleeve and wherein when the plug is released the lip rests on the sleeve at an uppermost of the ends with the apex inside the uppermost of the openings in the sleeve.

4. The fitting of claim 3 wherein the uppermost of the openings in the sleeves has a chamfered lip for guiding the released plug into the non-flammable sleeve.

5. The fitting of claim 1 wherein the non-flammable sleeve has an enlarged outer ring above an elongate cylinder portion on an outside wall around the longitudinal axis of the main conduit and wherein a plastic spacer tube is mounted on an inside wall of the main conduit and the elongate cylindrical portion of the sleeve to hold the sleeve in the main conduit.

6. The fitting of claim 1 wherein the flammable support is provided by a low melting temperature plastic harness with a strap upon which the plug rests.

7. The fitting of claim 6 wherein the harness is attached adjacent to the extension conduit opening.

8. The fitting of claim 7 wherein the harness is mounted in an enlarged portion of the extension conduit adjacent to the closure means for the extension conduit opening.

9. The fitting of claim 1 wherein the closure means includes an elastomeric cap secured adjacent to the extension conduit opening by a ring clamp.

10. The fitting of claim 1 wherein the second axis is at an angle (alpha) between about 10 and 45 degrees from the first axis so that when the first axis is vertical the plug will fall by gravity into the main conduit and sleeve from the extension conduit upon release of the flammable support.

11. The fitting of claim 1 wherein the main conduit includes a coupling around which cement is poured.

12. The fitting of claim 1 wherein the main conduit includes a coupling which is inserted into a cored opening in the floor.

13. A building construction which prevents spread of fires between a floor of the building through a pipe which comprises:

(a) a stack fitting which prevents spread of fire which comprises:
a flammable, fluid carrying main conduit having a first longitudinal axis between two opposed openings and adapted to be connected through the floor in the building to vertically oriented fluid conduit pipe between floors;
a flammable extension conduit from the main conduit positioned with a second axis at an acute angle from the longitudinal axis of the main conduit with an opening;
a non-flammable plug mounted in the extension conduit on a plastic support provided in the extension conduit which is releasable by melting at a lower temperature than the conduits upon exposure of the support to heat through the main conduit from a fire in the building below the floor to thereby move the plug into the main conduit;
closure means for the extension conduit opening; and
a non-flammable sleeve with openings at opposed ends mounted inside the main conduit below the plug and extension conduit, wherein the plug when the flammable support is released the plug falls into the non-flammable sleeve to close the non-flammable sleeve and prevent the spread of fire between the floors;

(b) a floor mounting the main conduit of the fitting so as to convey fluid through the floor; and (c) fluid carrying pipe connected to both openings of the main conduit.

14. The building construction of claim 13 wherein the main conduit includes a plastic coupling mounted through the floor.

15. The building construction of claim 13 wherein the fitting the main conduit and extension conduit are integral each having a circular internal cross-section, wherein the non-flammable sleeve has a circular cross-section, wherein the plug is shaped as a cone with a base and with an opposite truncated apex pointed towards the main conduit and wherein upon release the plug enters into an uppermost of the openings in the sleeve to close the opening.

16. The building construction of claim 15 wherein the plug in the fitting has an integral lip adjacent the base having a diameter slightly smaller than an internal diameter of the extension conduit and slightly larger than an internal diameter of the sleeve and wherein when the plug is released the lip rests on the sleeve and an uppermost of the ends with the apex inside the uppermost of the openings in the sleeve.

17. The building construction of claim 16 wherein the uppermost of the openings in the sleeve has a chamfered lip for guiding the released plug into the sleeve.

18. The building construction of claim 13 wherein the non-flammable sleeve has an enlarged outer ring above an elongate cylindrical portion on an outside wall around the longitudinal axis of the main conduit and a plastic spacer tube is mounted on an inside wall of the main conduit and the elongate cylindrical portion of the sleeve to hold the sleeve in the main conduit.

19. The fitting of claim 1 wherein the plastic support is provided by a harness with a strap upon which the plug rests.

20. The building construction of claim 13 wherein the harness is attached adjacent the extension conduit opening.

21. The building construction of claim 20 wherein the harness is mounted in an enlarged portion of the extension conduit adjacent to the closure means for the extension conduit opening.

22. The building construction of claim 13 wherein the closure means includes an elastomeric cap secured adjacent to the extension conduit opening by a ring clamp.

23. The building construction of claim 13 wherein the second axis of the fitting extension conduit is at an angle of between about 10° and 45° to the first axis of the main conduit so that the plug will fall by gravity into the main conduit from the extension conduit upon release of the flammable support.

* * * * *

UNITED STATES PATENT AND TRADEMARK OFFICE
CERTIFICATE OF CORRECTION

PATENT NO. : 4,724,858

DATED : February 16, 1988

INVENTOR(S) : Kenneth R. Cornwall

It is certified that error appears in the above—identified patent and that said Letters Patent is hereby corrected as shown below:

Column 1, line 16, "Pat. No. 4,583,546" should be
--Pat. No. 4,583,565--.

Column 1, line 33, "less inexpensive" should be --less expensive--.

Column 2, line 38, "then" should be --the--.

Column 2, line 46, "Pat. No. 4,583,546" should be
--Pat. No. 4,583,565--.

Column 4, line 55, "cylinder" should be --cylindrical--.

Signed and Sealed this

Twelfth Day of July, 1988

Attest:

DONALD J. QUIGG

*Attesting Officer*  *Commissioner of Patents and Trademarks*